Jan. 30, 1962 H. MULTHOPP 3,018,987
BLOWN TAIL ARRANGEMENT FOR LOW SPEED
CONTROLLABILITY OF AN AIRCRAFT
Filed Sept. 29, 1958 3 Sheets-Sheet 1

INVENTOR.
HANS MULTHOPP
BY Julian C. Renfro
ATTORNEY

Jan. 30, 1962 H. MULTHOPP 3,018,987
BLOWN TAIL ARRANGEMENT FOR LOW SPEED
CONTROLLABILITY OF AN AIRCRAFT
Filed Sept. 29, 1958 3 Sheets-Sheet 2

INVENTOR.
HANS MULTHOPP
BY
ATTORNEY

INVENTOR.
HANS MULTHOPP

United States Patent Office 3,018,987
Patented Jan. 30, 1962

3,018,987
BLOWN TAIL ARRANGEMENT FOR LOW SPEED
CONTROLLABILITY OF AN AIRCRAFT
Hans Multhopp, Overlea, Md., assignor to Martin-Marietta Corporation, a corporation of Maryland
Filed Sept. 29, 1958, Ser. No. 763,913
15 Claims. (Cl. 244—75)

This invention relates to a blown tail arrangement for an aircraft, and more particularly to an aircraft having a tail arrangement employing the jet flap principle, not only to achieve controllability in pitch at low speeds, i.e., for creating a down load to balance the nose-down pitching moments of the wing, but also of develop a side load tending to overcome, in the event of loss of power of an engine of a multi-engine aircraft, a yawing tendency of the aircraft.

The jet flap principle has been utilized in aircraft by causing the products of combustion emanating from a jet type engine to be exhausted through a flat nozzle or slot extending adjacent a movable control surface of the aircraft so that the exhaust gases flow across the surface and augment lift by inducing circulation about the surface. As an example, my co-pending patent application entitled "Wing Arrangement" filed January 27, 1956 and bearing Serial No. 561,809 now Patent No. 2,964,264 describes and claims a particular jet flap arrangement. A report entitled "The Jet Augmented Flap" promulgated by the Institute of Aeronautical Sciences (IAS Preprint 715—1957) represents an extensive study of Jet Flaps, their history and utility, by Lowry, Riebe and Campbell.

So far, the jet flap concept has been applied mostly to wings in order to increase their maximum lift capability and thus reduce the minimum speed of the aircraft. Whenever the ability to fly slowly is an important requirement, it is found that a maximum lift problem exists not only for the wing but even more severely for the tail surfaces. Fortunately, the amount of air required for the tail surfaces is considerably less than what is needed for the wing; therefore, relatively small quantities of available pressurized gases can be utilized effectively in the tail, such as the exhaust from turbo-prop engines. This kind of a blowing air supply comes practically free, i.e. without any appreciable degradation of the propulsive efficiency of the power-plant. Furthermore, the air quantities involved are usually too small to have been used effectively for jet flap type blowing over the wing. Other arrangements also may be used such as utilizing compressor bleed air from turbojet engines.

Therefore, according to the present invention, a jet flap arrangement is used in association with the tail surfaces of an aircraft so as to increase substantially the range of normal forces created on each portion or half of the tail, a suitable combination of which forces serve to control the aircraft about its vertical and lateral axes, thereby improving its low speed performance. This invention is admirably suited for use in transport type aircraft, for in the past, transport aircraft have necessarily had disproportionately large tail surfaces, which not only are heavy and expensive, but also create substantial drag at operational speed. Furthermore, considerable pilot effort has been involved in the flying of such aircraft, for the elevators must be kept deflected in the upward position during low speed flight not only in order to balance the nose-down tendency of the aircraft caused when the wing flaps are lowered, but also in order to compensate for the center of gravity being forward of the so-called neutral point or aerodynamic center in a stable aircraft.

According to this invention, the tail surfaces can be kept to a minimum size, because this blown tail arrangement advantageously creates a balancing effect for the aircraft by increasing the value of $C_L$ in the formula for lift $$L_{max} = \tfrac{1}{2} \rho S C_{L_{max}} V^2$$

where $\rho$ is air density, $S$ is area of the tail, $C_{L_{max}}$ is maximum lift coefficient, and $V$ is aircraft velocity. This means that during the take-off regime in particular, when velocity is low, instead of necessitating an enlarged tail surface area $S$, the requisite lift is obtained as a result of the increased lift coefficient. In typical prior art arrangements, the value of $C_{L_{max}}$ is in the order of magnitude of 1 to 1½, whereas in the blown tail arrangement according to this invention, $C_{L_{max}}$ can be of order of magnitude of at least 4, which of course makes possible much better controllability of the aircraft than would otherwise be the case. This increase in $C_{L_{max}}$ is of course made possible by high energy gases generated by the engines of the aircraft being directed through a nozzle arrangement extending along the trailing edge of the fixed tail surfaces so that a substantially continuous blanket of air through the nozzle area is arranged to flow across the movable control surfaces to increase lift capabilities of the tail much above and beyond the values otherwise obtainable, this effect being known as "super-circulation" by aerodynamicists. As will be discussed at greater length herein, however, the high velocity gases are directed along the underside of the movable control surfaces of the tail so that this additional "lift" of the tail is created in the downward direction to compensate for the nose-down pitching moments ordinarily associated with aircraft of the transport type, for example.

The blown tail arrangement according to this invention may advantageously be employed in certain configurations as to create a substantial amount of lateral or sideward force at the tail when the power of an engine of a multi-engine aircraft is lost. This salutary effect is achieved by creating in the tail arrangement, separate portions served by certain engines of the aircraft, with the gases generated by each engine being directed across respective movable control surfaces of the tail in such a direction as not only to create a downward vectorial component, but also a lateral vectorial component. By appropriate design of the tail, the lateral vectorial components ordinarily balance out when all of the engines of the aircraft are operational, so there is no corrective effort on the part of the pilot necessary in order to prevent a yawing tendency.

However, upon the loss of power of an engine, the portion of the tail served thereby is deprived of hot gases, so the lateral vectorial component due to blowing is not established for that portion of the tail. This means that the portion of the tail served by the intact engine or engines of the aircraft continues to be affected by the high velocity gases flowing therefrom, at which location it is desired to create a lateral force so as to compensate for the yawing moment from the thrust of the intact engine. By feeding the blowing air into certain selected sections of the tail, this compensating yawing moment can thus be achieved almost automatically.

An inverted V-tail configuration is the most natural tail shape to go along with the concepts according to this invention, with the engine generated gases flowing across the underside of the movable control surfaces associated with each portion of the tail inherently causing lift to be established in such a direction as to provide a suitable downward force as well as lateral forces in the proper direction. It is apparent that with all engines working at the same power rating, the lateral forces of the two sides will cancel one another out as they should do. With an engine failure on one side, the blowing on the opposite side of the tail creates with the usual up deflection of the movable surfaces just the kind of combined tail force needed at low speeds, namely, a download for longitudinal control and a side load for yaw control.

The inverted V-tail can be supported from two trail booms forming extensions of the engine nacelles, which provide the shortest possible conduits for the hot gases from the engine to the respective tail portions. In addition to possessing aerodynamic advantages as described above, the high vertical position of the center portion of an inverted V-tail enables the rear end of the fuselage to be easily accessible for loading purposes.

The objective of the invention can be achieved by a few alternate arrangements of the tail, all of which are markedly inferior to the inverted V-tail, e.g. with a regular V-tail mounted on the rear of the fuselage, the blowing air is needed to be fed by a crossover arrangement in order to obtain the same effect. With the more conventional cross or H-tails the horizontal and vertical loads are essentially independent of one another; blowing air is fed into the lower side of the horizontal surfaces and into both sides of the vertical surfaces, in such a manner that the engine generated gases from the right side of the wing go into the nozzles on the left side of the tail surfaces and vice versa.

These and other advantages will be apparent from the enclosed drawings in which.

Figure 1:
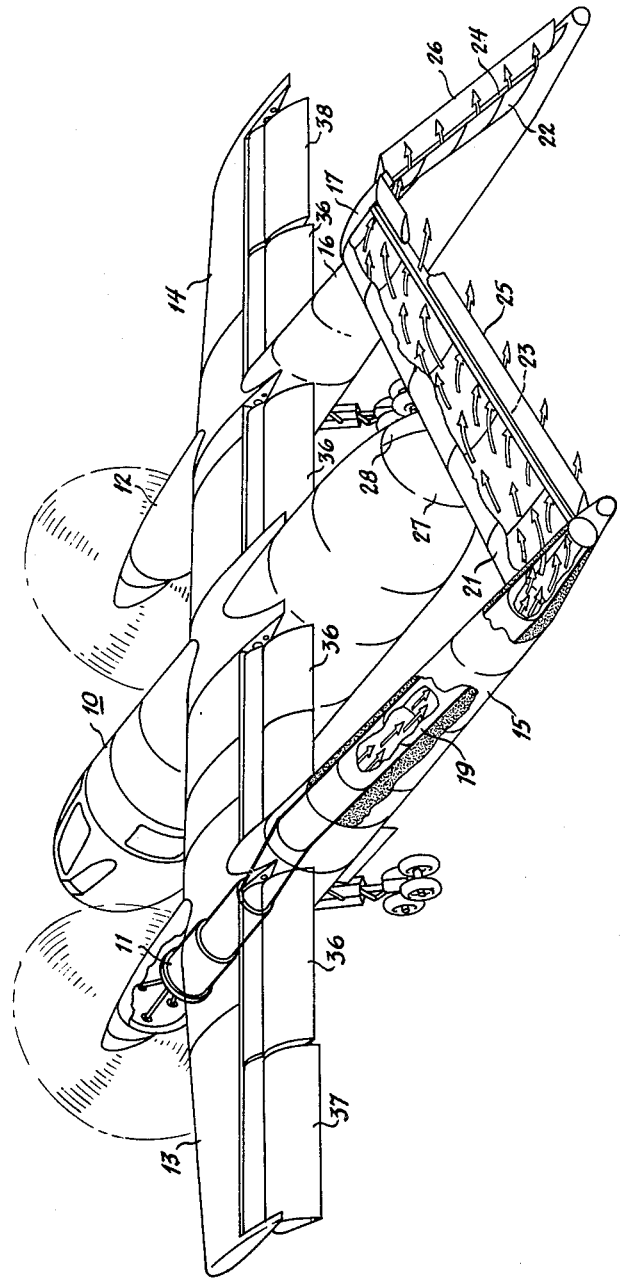
FIGURE 1 is a perspective view from the rear quarter of a preferred embodiment of a blown tail aircraft during take-off, with portions of the aircraft removed to reveal a typical flow of exhaust gases through relatively fixed tail surfaces and across the underside of movable control surfaces of the tail.

Referring first to FIGURE 1, a preferred embodiment of an aircraft 10 is illustrated, equipped with turbo-prop engines 11 and 12, each of which drives a suitable propeller in order to provide the principal thrust of the aircraft. Engines 11 and 12 are mounted on left and right wings 13 and 14 respectively, and although only two engines are shown, it is to be understood that two engines on each wing or even other multi-engine arrangements could be employed if desired. As is known to the prior art, the exhaust gases expelled from these engines can be utilized to provide a degree of additional thrust for the propulsion of the aircraft.

Figure 4:
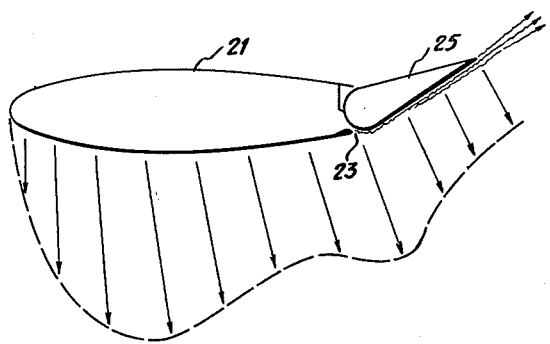
FIGURE 4 is an enlarged cross-sectional view of a typical section of the tail, illustrating pressure distribution forces thereover, as well as nozzle means for directing engine generated gases across the underside of the movable control surface.

According to this invention, however, the exhaust gases are not merely used for providing additional thrust, but rather are used in a blown tail arrangement for increasing the low speed controllability of an aircraft so equipped. According to the illustrated embodiment, twin trail booms 15 and 16 are provided, extending rearwardly from engines 11 and 12 respectively, these booms supporting the inverted V-tail arrangement 17. Each half or portion of tail assembly 17 is substantially hollow as best seen in FIGURES 1 and 4, and the arrangement is such that engine generated gases, such as gases exhausted by a prop jet engine (or compressor bleed air from turbo-jet engines) can flow comparatively uninterruptedly through inclined, fixed tail portions 21 and 22 of the tail, then to issue forth therefrom as shown in these figures. A suitable duct 19 is contained in boom 15 for carrying the hot gases from engine 11 rearwardly to the juncture of boom 15 with portion 21 of tail 17. Similarly, another duct, not shown, conducts the exhaust gases from engine 12 to portion 22 of the tail assembly, so that typically a substantially equal amount of engine generated gases flow through and issue rearwardly from the respective tail portions through suitable nozzle means or slots 23 and 24 provided therein.

FIGURE 4 may be regarded as a typical cross-sectional view taken through left tail portion 21, with nozzle or slot means 23 revealed to be arranged to direct the engine generated gases across the underside of movable control surface 25, to create normal forces at the tail so as to bring about the advantageous results obtained by the use of this invention. This amounts to an application of the jet flap principle, as was described at perhaps greater length in my aforementioned patent application, as well as in my patent application entitled "Ducted Fan Engine Arrangement," Serial No. 641,882, filed February 25, 1957. The issuance of engine generated gases from slots 23 and 24 increase substantially the normal forces created on each half or portion of the tail, a suitable combination of these forces serving to control in a highly advantageous manner the aircraft about its vertical axis. In normal, straightforward flight, the movable control surfaces 25 and 26 are deflected proportionally by movements of the control column, so that the lateral force components on the two surfaces cancel one another out. Furthermore, the downward vectorial components created at the tail assembly are successful in most flight regimes to substantially balance out the nose-down tendency of the aircraft that would otherwise occur due to the forward placement of the center of gravity of the aircraft, and the effect created by lowered flaps during take-off. Note the vectorial forces created on one half of a tail by the intact engine of FIGURE 3.

During takeoff, flaps 36 are deflected as shown in FIGURE 1 to increase lift, which action may be supplemented by ailerons 37 and 38 also being deflected. As will be understood, the ailerons are differentially operable for flight maneuvers.

Particularly in STOL (short take-off and landing) aircraft, the vertical tail becomes a severe design limitation, for Military Specifications state that an aircraft must be controllable despite the loss of power of an engine, even at speeds as low as 1.2 times stall speed. Commercial aircraft requirements are even more strict. How the present arrangement provides low speed controllability will now be discussed in more detail.

Figure 2:
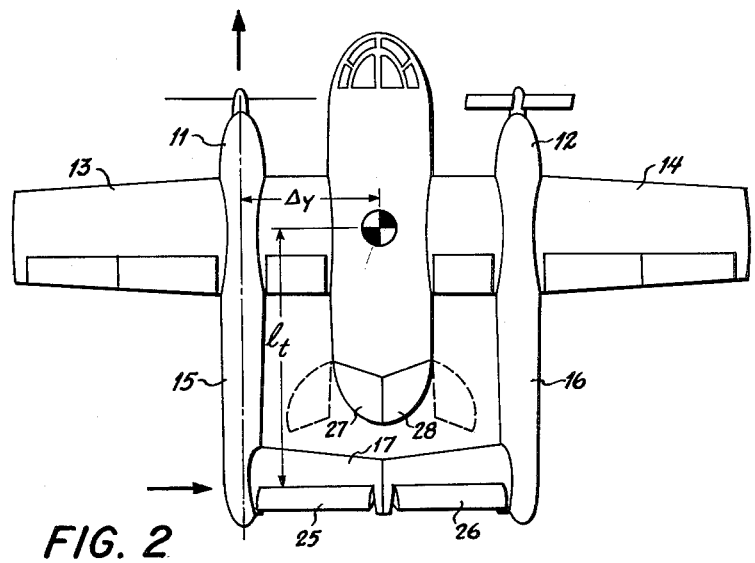
FIGURE 2 is a plan view showing how the yawing tendency created by the operation of a single engine can be balanced by the blown tail arrangement according to this invention.

Referring to FIGURE 2, assuming that the right hand engine 12 has failed, the yawing moment created by the efforts of the engine 11 are represented by the equation $$N = T \cdot \Delta Y$$

where N is the unbalanced moment, T is thrust of the intact engine, and $\Delta Y$ is the distance between the center lines of the engine and the aircraft. Substituting for thrust in the above equation, the yawing moment required to be balanced becomes $$N = \frac{P\eta}{V} \cdot \Delta Y$$

where P is engine power, $\eta$ is efficiency, and V is velocity.

This moment must be balanced by the side force at the tail multiplied by the tail lever arm $l_t$, or in other words, $$F_s \cdot l_t = \frac{P\eta}{V} \cdot \Delta Y$$

The side force $F_s$ is equal to $$F_s = C_{L_s} \rho/2 V^2 S_v$$

where $C_{L_s}$ is sideward lift coefficient, and $S_v$ is the vertical area of the tail assembly. By substituting the value of $F_s$ in the foregoing moment balancing equation and solving for control volume, the equation becomes $$C_{L_s} S_v = \frac{P\eta}{(\rho/2) V^3} \cdot \frac{\Delta Y}{l_t}$$

As will therefore be appreciated, the problem of creating sufficient tail force becomes most severe at low speeds, and only by increasing the $C_{L_s}$ or $S_v$ terms will an unbalanced engine effort be compensated for. According to the present invention, the $C_{L_s}$ term is increased rather than it being necessary to increase the vertical area of the tail $S_v$.

As will be seen from a study of FIGURE 4 of the above-referenced IAS Preprint, the $C_L$ of a tail assembly can be increased several fold over an unblown surface. In that figure, jet-circulation lift $(C_L)_\Gamma$ is plotted versus aspect ratio A. As will be noted from an inspection of FIGURE 4, $(C_L)$ increases rapidly as the $C\mu$, the blowing thrust coefficient is increased at low values of $C\mu$, but tends to reach a maximum value at the higher values of $C\mu$.

Typical values of $C_L$ due to blowing were found in one application of the jet flap principle to vary from about 5 to 3½ in the speed range between 40 and 60 knots, whereas the basic lift coefficient of the tail surface without blowing was only slightly over 1.

Inverted V-tail configuration is the most natural tail shape to go along with the concept according to this invention, for the aerodynamic advantages thereof are considerable. The hot gases flowing across the underside of the movable control surfaces 25 and 26 inherently cause "lift" to be established in such a direction as to provide lateral forces in the proper direction contemporaneously with the creation of downward forces, as was noted in FIGURE 3. The nozzles or slots are arranged so that hot gases can issue therefrom despite the position of the movable control surfaces. When the engines of the aircraft are operated at or near the same speed, a similar amount of hot gases will of course issue through the nozzle or slot means of each respective tail portion, thereby creating no unbalanced lateral forces.

Figure 3:
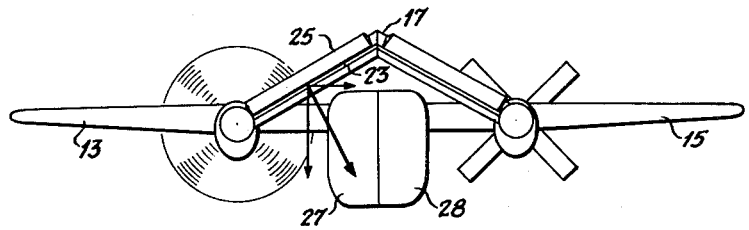
FIGURE 3 is a rear view of the aircraft shown in FIGURE 2, revealing the vectorial forces that are created at the tail in the event of engine failure on one side.

Structural advantages accompany the aforementioned aerodynamic advantages of the inverted V-tail, for the fixed tail portions 21 and 22 secured together as shown in FIGURES 1 and 3 not only gives strength, but also it places most of the tail surface a substantial height off the ground when the aircraft is parked, and therefore affords excellent access for the loading and unloading of the fuselage. Doors 27 and 28 can be provided at the aft end of the fuselage so that trucks or other carriers can be backed below the tail assembly directly into contact with the cargo carrying portion of the fuselage.

The inverted V-tail configuration has been found to have satisfactory flight characteristics, and well known prior art control cable arrangements can be employed for the superpositioning of what otherwise would have been elevator and rudder operations. According to such an arrangement, forward or rearward movements of the control column by the pilot or pilots of the aircraft cause the movable control surfaces of the tail to move both up and down together in the manner of elevators, whereas movements of the rudder pedals cause the control surfaces to move differentially.

Figure 5:
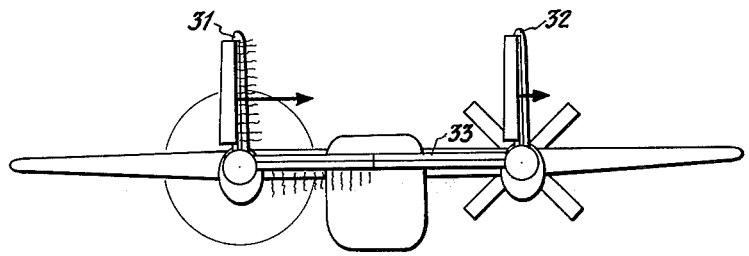
FIGURE 5 is an alternative tail arrangement, revealing the flow of engine generated gases at the tail in order to create a corrective force.
Figure 6:
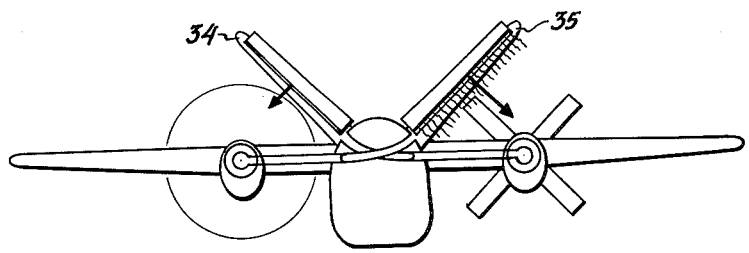
FIGURE 6 is second alternative tail arrangement with a portion of the aircraft cut away to reveal a crossover feed arrangement for the tail.

As shown in FIGURES 5 and 6, other tail configurations can be employed with this novel concept so as to take advantage of the forces created in the instant blown tail arrangement. In FIGURE 5, the arrangement is such that gases emanating from the left and right engines issue respectively from vertical tail surfaces 31 and 32. These gases are directed rearwardly and toward a vertical plane passed through the center line of the aircraft, so that the lateral forces created on each tail half due to supercirculation will be in the corrective direction. The gases issuing from appropriate slots or nozzles in the horizontal portion 33 of the tail are directed along the underside of the control surface or surfaces located thereon so as to create "lift" in the downward direction. As shown in this figure the right hand engine has failed, and the rudders have been turned in a compensating direction. The ducting may be arranged so that only the vertical tail surface directly behind an engine will be supplied with engine generated gases from it, so a corrective lateral "lift" will be created by the flow of engine generated gases only on that vertical tail surface in the event of the loss of an engine. Note the large arrow in FIGURE 5 denoting this corrective force that is created on the inboard surface of member 31. If desirable to create lateral forces at such vertical tail surface, this could have been accomplished by utilizing a cross-over ducting arrangement in the general nature of that shown in FIGURE 6 in order to also supply gases to the remote side of the tail surface residing behind the other engine, or as viewed in FIGURE 5, to the right hand side of surface 32.

In the configuration according to FIGURE 6, a V-tail is shown, so in order for the exhaust gases to create downward force components, the gases are directed downwardly and away from a vertical plane passed through the center line of the aircraft. Therefore, in order to afford a construction in which the forces created by the blown tail are in the correct direction to compensate for yaw resulting from the loss of an engine, a crossover feed arrangement is provided in which the hot gases from the left engine are directed to the right hand tail surface 35 and from the right engine to surface 34. In this figure, the large arrow denotes the corrective force created by the gases emanating from the intact left engine.

It is to be understood that other configurations may be created to take advantage of the movable concept according to this invention, such as inclined tail surfaces generally arranged in an inverted V configuration, but without the tips thereof being joined together as shown in FIGURES 1 and 4 of the drawings. Furthermore, the engines involved may be of the turbo-jet type in which no propellers are utilized, in which event only a portion of the compressor or jet exhaust gases thereof are bled off for the use by the blown tail arrangement. Duct losses have been found to be comparatively small, usually in the neighborhood of 2% to 3% of the total power of the engines. Reciprocating engines driving propellers could possibly be utilized, although not as advantageously as jet type engines inasmuch as the air flow through a reciprocating engine is only approximately ⅕ of the air flow through a jet type engine.

Figure 7:
FIGURE 7 is an enlarged cross-sectional view of an alternative tail construction in which a variable area nozzle arrangement is provided for the establishment of tail moments in the desired direction.

It should be borne in mind that this invention was primarily designed to effectively utilize the surplus energy of the engines of an aircraft, in the location wherein it will have the most beneficial effect, namely the tail to increase the controllability of an aircraft at low speeds. Although, as previously described, the preferred design for a blown tail arrangement according to this invention involves blowing over a movable control surface at the tail, it is possible to achieve this blown tail effect without the use of hinged movable control surfaces. As shown in FIGURE 7, the fixed surface of the tail could be designed to have a variable direction nozzle at the trailing edge with gas from the respective engine flowing thru the hollow tail and then outwardly over surface 42, to create lift in one or the other direction. By appropriate movements of valve 39 by the pilot, engine generated gases can be caused to flow either through slot or nozzle 40 or slot or nozzle 41 so as to create a lifting moment at the tail in the desired direction. This type of arrangement was described at some length in a publication by the Aerodynamics Institute in Gottingen, Germany, commemorating the 60th birthday of Albert Betz in December ber, 1945. One of the papers contained in that publication was entitled "On the Improvement of Wing Section Characteristics by Boundary Layer Control" by F. Ehlers and A. Walz, this article beginning on page 29 of the publication.

FIGURE 19 of that paper is an arrangement after which FIGURE 7 of this application was patterned, and it was found that control could in fact be achieved by blowing over a round trailing edge. Selective blowing was obtained on both the pressure and on the suction side by means of a rotary valve suggested by Albert Betz, and a plot of lift coefficient $C_A$ with blowing quantity $C_Q$ as a parameter revealed the characteristics of this type of device to be satisfactory. This type of arrangement could be utilized in the blown tail arrangement according to my invention, and would have quite satisfactory characteristics for low speed control. However, at high speeds, there probably would not be enough tail effect to afford the controllability necessary for satisfactory flight characteristics of the aircraft.

The temperature in the ducts in booms 15 and 16 of FIGURE 1 has been found to be in the neighborhood of several hundred degrees Fahrenheit. Therefore it has been necessary to utilize heat-resistant and corrosive-resistant materials such as stainless steel in the construction of these members and the tail surfaces to avoid burnout thereof. As to the movable control surfaces 25 and 26, across the underside of which blow the hot gases, these may be made of stainless steel also, but an even more preferable design is a laminated thermal insulator construction of the type set forth in the copending application of Lyle Wallis et al., S.N. 673,146, filed July 22, 1957, now Patent No. 2,924,537 and entitled "Laminated Thermal Insulation." According to that application, it was found that stainless steel was not altogether satisfactory for the construction of blown flaps because it is heavy, it is not a thermal insulator, and it is galvanically incompatible with aluminum and other metals typically encountered in aircraft construction.

According to the Wallis application, a laminated thermal insulator construction for a blown flap comprises a base structure of thermally-stable, fiber-reinforced plastic material, a layer of conductive metal such as copper firmly bonded to one surface of the base structure and a layer of ceramic insulating material firmly bonded to the layer of metal. The plastic material is preferably of low density, and the ceramic material must have low thermal conductivity and a high melting point, and as specified in that application, it is preferable to use zirconium dioxide as the ceramic material. The resulting laminated structure, which is of course described at length in the Wallis et al. application, may advantageously be employed in the construction of the blown tail arrangement according to the present invention by securing it to the basic structure of the movable surfaces 25 and 26, thereby to serve as protection against the hot gases emanating from slots 23 and 24.

In a similar manner, the ducts and fixed tail surfaces can be made of composite materials rather than stainless steel or the like, according to the aforementioned techniques set forth in the Lyle Wallis patent application. According to that application, structures such as ducts or the like for carrying hot gases are built up in alternate layers of thin metal and insulating material, with the thin metal layers being attached by appropriate means to structural members of the aircraft so that such members can function as a "heat sink." In that manner heat will automatically be conveyed to an external surface of the aircraft, such as to the outer surfaces of ducts 15 and 16 where the heat can be carried away by the substantial air flow thereover. If this type of construction be utilized in the construction according to this invention, the fixed tail surfaces would be of multi-layered construction and of an appropriate thickness so as to be sufficiently rigid as to make internal rib construction unnecessary under most circumstances. However, if necessary to employ internal construction for the tail surfaces, such should be of appropriate material such as stainless steel and covered or coated by an appropriate compound such as of asbestos in order to prevent excessive corrosive effect due to the flow of hot gases thereover. The rate of issuance of gases from the slots or nozzles of the tail surfaces can be made fairly even across the trailing edge of each surface by appropriate configuration design. As will be noted in FIGURE 2, the leading edge of the fixed tail surfaces taper toward the center portion of the tail so that the gases issuing from portions of the tail near the center point of the tail will create an amount of lift proportional to that created near the joinder of the tail with the booms.

The low speed controllability achieved in aircraft equipped according to this invention is obtained by the use of straightforward, uncomplicated arrangements utilizing present day technology, these advantages being achieved with rather small weight penalty. Additionally, the pilot has no additional responsibilities in order to achieve the salutary forces provided by the blown tail arrangement, for in the event of a loss of an engine of a multi-engine aircraft, the lateral forces serving to correct the yawing tendency are self establishing.

I claim:

1. A blown tail arrangement for a multi-engine aircraft comprising a tail assembly having inclined fixed tail surfaces, and movable control surfaces hingedly attached to said fixed surfaces, nozzle means adjacent the underside of said tail surfaces, arranged to direct gases generated by said engines across the lower portions of said movable control surfaces to increase the normal forces on the underside of said tail, duct means for supplying certain portions of said tail assembly with gases from certain engines, the forces created at said tail assembly having downward vectorial components as well as lateral vectorial components due to the inclination thereof, said lateral vectorial components being substantially balanced when all of the engines of said aircraft are operational, but being unbalanced when an engine is not operational due to the portion of the tail assembly corresponding to that engine being deprived of engine generated gases, the unbalanced force created at the tail assembly under such circumstance being in the direction to compensate for a yawing tendency of the aircraft caused by unbalanced engine effect, whereby a corrective lateral force is created automatically at said tail assembly in the event of the loss of power of an engine of said aircraft.

2. The arrangement as defined in claim 1 in which a pair of booms are provided for the support of said tail assembly, each boom having means for conducting gases from an engine to a respective portion of said tail assembly.

3. The arrangement as defined in claim 1 in which boom means are provided for supporting said tail assembly, the left hand boom of the aircraft being provided with means for conducting exhaust gases from an engine located in the left wing to issue from the nozzle means of a left portion of the tail assembly, and the right hand boom having means for conducting exhaust gases from an engine located in the right wing to a right portion of said tail assembly.

4. The arrangement as defined in claim 3 in which said tail assembly is generally in the configuration of an inverted V.

5. An aircraft propelled by at least two propulsion engines, said aircraft comprising an arrangement of tail surfaces generally in the configuration of an inverted V with movable control surfaces hingedly attached thereto, said tail arrangement being supported by a pair of booms extending rearwardly from a forward portion of said aircraft, ducting means for conducting engine generated gases from said engines through said booms to respective inclined portions of said tail arrangement, means adjacent the hinge line of each of said control surfaces for directing gases emanating from each engine across the underside of a respective control surface, the lift force created at each inclined portion of the tail by the flow of gases being not only in the lateral direction, but also in the downward direction to compensate for nose down pitching moment of said aircraft during low speed flight, said lift forces, in the event of the loss of power of an engine, existing only at the tail portion corresponding to the intact engine, and in the opposite sense to the yawing tendency created by the intact engine, so as to compensate therefor and tend to balance the flight attitude of said aircraft.

6. The aircraft as defined in claim 5 in which said engines are turboprop engines, with said engine generated gases being the exhaust from said engines.

7. The aircraft as defined in claim 5 in which said engines are turbojet engines, with said engine generated gases being compressor bleed air.

8. In an aircraft having at least two propulsion engines, a blown tail arrangement comprising a pair of inclined tail surfaces generally in the configuration of an inverted V, and a pair of booms for supporting said tail at a fixed distance with respect to an aircraft, each of said tail surfaces having a movable control surface hingedly attached thereto, duct means in said booms for conducting engine generated gases to a respective half of said tail, and nozzle means for directing said gases across the underside of said movable control surfaces, the quantity of gases flowing over each half of the tail causing a substantial increase in the normal force created at said tail, with the direction of said normal forces being such as to create both vertical and lateral force components, the normal forces created as the result of the operation of two engines on opposite sides of said aircraft causing the lateral forces created at each tail half to substantially cancel, but in the event of the loss of power of an engine, its respective half of the tail is deprived of its flow of engine generated gases, whereby the lateral forces created at the opposite tail half is effective to tend to overcome a yawing tendency of the aircraft.

9. The blown tail arrangement as defined in claim 8 in which said movable control surfaces are arranged to be moved together on certain occasions to function in the manner of elevators, and to be moved differentially on other occasions to assist in the execution of turning movements of said aircraft.

10. The method of automatically creating a corrective lateral force at the tail assembly of a multi-engine aircraft in the event of the loss of power of an engine, comprising the steps of conducting a quantity of engine generated combustion gases from certain engines of said aircraft to respective angularly disposed portions of said tail assembly, causing said gases to issue across the movable control surface associated with respective tail portions, so as to increase the normal forces on the undersides thereof, said normal forces having both vertical as well as lateral vectorial components, said lateral components being balanced out during balanced engine operation, but in the event of the loss of power of an engine, the lateral component created at the tail portion corresponding to an intact engine providing corrective lateral force to prevent a yawing tendency of said aircraft.

11. In an aircraft having at least two engines, a blown tail arrangement for the aircraft comprising at least two inclined tail surfaces, nozzle means on each of said surfaces for directing engine gases across said surfaces so as to bring about circulation and thereby a substantial increase in the range of normal forces created over said surfaces, ducting means connected to respective nozzle means for conducting a quantity of gases from each engine to issue across a respective surface, the normal forces created at the tail surfaces ordinarily having balanced lateral components due to the inclination of the surfaces, the lateral force created at each tail surface being in the opposite direction with respect to the center of gravity of the aircraft to the propulsive effort contributed by the respective engine, whereby any yawing tendency of the aircraft upon the loss of an engine is automatically compensated for by the loss of the lateral force at the respective tail surface.

12. The blown tail arrangement as defined in claim 11 in which said lifting effect at the tail has a downward component, thereby tending to balance a nose-down tendency of said aircraft.

13. The blown tail arrangement as defined in claim 11 in which a variable area nozzle is provided adjacent the trailing edge of said tail surface, arranged to enable selective blowing therethrough so that tail moment can be varied.

14. The aircraft as defined in claim 11 in which said tail surfaces are joined together generally in the configuration of an inverted V.

15. The aircraft as defined in claim 11 in which said tail surfaces are arranged in a V configuration.

References Cited in the file of this patent

UNITED STATES PATENTS

| | | |
|---|---|---|
| 2,372,301 | Stalker | Mar. 27, 1945 |
| 2,479,487 | Goembel | Aug. 16, 1949 |

FOREIGN PATENTS

| | | |
|---|---|---|
| 968,079 | France | Apr. 12, 1950 |
| 1,147,066 | France | June 3, 1957 |